United States Patent [19]
Lindsay

[11] Patent Number: 5,515,719
[45] Date of Patent: May 14, 1996

[54] CONTROLLED FORCE MICROSCOPE FOR OPERATION IN LIQUIDS

[75] Inventor: Stuart Lindsay, Tempe, Ariz.

[73] Assignee: Molecular Imaging Corporation, Tempe, Ariz.

[21] Appl. No.: 246,035

[22] Filed: May 19, 1994

[51] Int. Cl.$^6$ ..................................................... G01B 5/28
[52] U.S. Cl. ........................................................ 73/105
[58] Field of Search ............................... 73/105; 250/306

[56] References Cited

U.S. PATENT DOCUMENTS

| | | | |
|---|---|---|---|
| Re. 33,387 | 10/1990 | Binnig | 250/306 |
| Re. 34,331 | 8/1993 | Elings et al. | 250/306 |
| Re. 34,489 | 12/1993 | Hansma et al. | 250/560 |
| 4,343,993 | 8/1982 | Binnig et al. | 250/306 |
| 4,422,002 | 12/1983 | Binnig et al. | 310/328 |
| 4,520,570 | 6/1985 | Bednorz et al. | 33/180 |
| 4,668,865 | 5/1987 | Gimzewski et al. | 250/306 |
| 4,724,318 | 2/1988 | Binnig | 250/306 |
| 4,785,177 | 11/1988 | Besocke | 250/442.1 |
| 4,800,274 | 1/1989 | Hansma et al. | 250/306 |
| 4,806,755 | 2/1989 | Duerig et al. | 250/306 |
| 4,823,004 | 4/1989 | Kaiser et al. | 250/306 |
| 4,837,435 | 6/1989 | Sakuhara et al. | 250/306 |
| 4,866,271 | 9/1989 | Ono et al. | 250/306 |
| 4,868,396 | 9/1989 | Lindsay | 250/440.1 |
| 4,871,938 | 10/1989 | Elings et al. | 310/328 |
| 4,877,957 | 10/1989 | Okada et al. | 250/306 |
| 4,889,988 | 12/1989 | Elings et al. | 250/306 |
| 4,902,892 | 2/1990 | Okayama et al. | 250/307 |
| 4,914,293 | 4/1990 | Hayashi et al. | 250/306 |
| 4,924,091 | 5/1990 | Hansma et al. | 250/306 |
| 4,935,634 | 6/1990 | Hansma et al. | 250/560 |

(List continued on next page.)

FOREIGN PATENT DOCUMENTS

| | | | |
|---|---|---|---|
| 85461 | 4/1988 | Japan . | |
| 203626 | 8/1993 | Japan | 73/105 |
| 59004 | 3/1994 | Japan | 73/105 |

OTHER PUBLICATIONS

Grigg et al., "Tip–Sample Forces in Scanning Probe Microscopy in Air and Vacuum", J. Vac. Sci. Technol. A10 (4), pp. 680–683, Jul./Aug. 1992.
Stuart M. Lindsay, Y. L. Lyubchenko, N. J. Tao, Y. Q. Li, P. I. Oden, J. A. DeRose and J. Pan, "Scanning tunneling microscopy and atomic force microscopy studies of biomaterials at a liquid–solid interface", J. Vac. Sci. Technol. A 11 (4), Jul./Aug. 1993, pp. 808–815.
Draft Paper: Mazur, et al., "Resonant Tunneling Bands and Electrochemical Reduction Potentials".
Draft Paper: O'Shea, et al., "Atomic force microscopy of (List continued on next page.)

Primary Examiner—Hezron E. Williams
Assistant Examiner—Daniel S. Larkin
Attorney, Agent, or Firm—D'Alessandro & Ritchie

[57] ABSTRACT

An atomic force microscope in which the deflection of the force sensing probe owing to surface forces is canceled by an opposing magnetic force applied to a small magnetic particle on a force sensing cantilever. A deflection of the force sensing cantilever is detected by reflecting a laser beam from the cantilever into a position sensitive detector. The voltage signal from the position sensitive detector is used to drive an integrating servo loop which drives a current in a solenoid placed close to the force sensing cantilever, and exerts a force opposing the atomic force of attraction between the force sensing cantilever and the sample surface via a small magnetic particle attached to the cantilever and having its magnetic moment aligned with the axis of the solenoid. In this way, deflection of the force sensing cantilever is prevented for any force within the range of the servo control system. The driving signal for the cantilever is a measure of the operating force of the microscope and can be used to drive a conventional atomic force microscope controller to generate topographical images of the surface. The system works submerged in water and other liquids and can be used for profiling soft surfaces while avoiding the problem of the force sensing cantilever being pulled into the sample surface by attractive interactions between the sample surface and the force sensing cantilever.

15 Claims, 4 Drawing Sheets

OTHER PUBLICATIONS local compliance at solid–liquid interfaces".

Draft Paper: Putnam, et al., "Viscoelasticity of living cells allows high–resolution imaging by tapping mode atomic force microscopy".

P. S. Jung, "Novel Stationary–Sample Atomic Force Microscope with Beam–Tracking Lens", Dec. 14, 1992.

G. Binnig, "Single–Tube Three–Dimensional Scanner for Scanning Tunneling Microscopy", Rev. Sci. Instrum. 57 (8), pp. 1688–1689, Aug. 1986.

Richard Sonnenfeld, "Atomic–Resolution Microscopy in Water", Science, vol. 232, pp. 211–213, Apr. 11, 1986.

P. Davidson, "A New Symmetric Scanning Tunneling Microscope Design", Journal of Vacuum Science & Technology: Part A, pp. 380–382, Mar./Apr. 1986.

O. Marti, "Atomic Force Microscopy of Liquid–covered Surfaces: Atomic Resolution Images", Appl. Phys. Lett. 51 (7), pp. 484–486, Aug. 17, 1987.

M. D. Kirk, "Low Temperature Atomic Force Microscopy", Rev. Sci. Instrum. 59 (6), pp. 833–835, Jun. 1988.

Richard Sonnenfeld, "Semiconductor Topography in Aqueous Environments: Tunneling Microscopy of Chemomechanically Polished (001) GaAs", 320 Applied Physics Letters 50 (24), pp. 1742–1744, Jun. 15, 1987.

S. A. Chalmers, "Determination of Tilted Superlattice Structure by Atomic force Microscopy", 320 Applied Physics Letters 55 (24), pp. 2491–2493, Dec. 11, 1989.

O. Marti, "Control Electronics for Atomic Force Microscopy", Rev. Sci. Instrum. vol. 59 (6) pp. 836–839, Jun. 1988.

Exhibit C, p. 691, copyright 1986.

Exhibit B, Paul West, "Chemical Applications of Scanning Tunneling Microscopy", IBM J. Res. Develop. vol. 30 (5), pp. 484–490, Sep. 1986.

Exhibit A, John Adam Kramer, Candidacy Report, pp. 1–48, May 21, 1985.

C. Mathew Mate, "Research Report–Determination of Lubricant Film Thickness on A Particulate Disk Surface by Atomic Force Microscopy", Apr. 25, 1989.

Y. Martin, "Atomic Force Microscope–Force Mapping and Profiling on a sub 100–A Scale", J. Appl. Phys. 61 (10), May 15, 1987.

H. Hanselmann, "Implementation of Digital Controllers–A Survey", Automatica, vol. 23 (1) pp. 7–32, 1987.

B. B. Damaskin, "Comprehensive Treatise of Electrochemistry vol. 1: Chapter 8: The Absorption of Organic Molecules", pp. 353–395.

G. Travaglini, "Scanning Tunneling Microscopy on Biological Matter", Surface Science 181, pp. 380–390, 1987.

F. Ohnesorge, "True Atomic Resolution by Atomic Force Microscopy Through Repulsive and Attractive Forces", Science vol. 260, pp. 1451–1456, Jun. 4, 1993.

Allan J. Melmed, "Art and Science and other Aspects of Making Sharp Tips", J. Vac. Sci. Technol. B 9 (2), pp. 601–608, Mar./Apr. 1991.

Inga Holl Musselman, "Platinum/Iridium Tips with Controlled Geometry Tunneling Microscopy", J. Vac. Sci. Technol. A, vol. 8 (4), pp. 3558–3562 Jul./Aug. 1990.

J. P. Ibe, "On the Electrochemical Etching of Tips for Scanning Tunneling Microscopy", J. Vac. Sci. Technol. A, vol. 8 (4), pp. 3570–3575, Jul./Aug. 1990.

L. A. Nagahara, "Preparation and Characterization of STM Tips for Electrochemical Studies".

Martin Specht, "Simultaneous Measurement of Tunneling Current and Force as a Function of Position Through A Lipid Film on A Solid Substrate", Surface Science Letters 257, pp. L653–658, 1991.

M. Brede, "Brittle Crack Propagation in Silicon Single Crystals", J. Appl. Phys. 70 (2), pp. 758–771, Jul. 15, 1991.

S. M. Hu, "Stress–Related Problems in Silicon Technology", J. Appl. Phys. 70 (6), pp. R53–R80, Sep. 15, 1991.

U.S. PATENT DOCUMENTS

| Patent No. | Date | Inventor | Class |
|---|---|---|---|
| 4,947,042 | 8/1990 | Nishioka et al. | 250/306 |
| 4,952,857 | 8/1990 | West et al. | 318/561 |
| 4,954,704 | 9/1990 | Elings et al. | 250/307 |
| 4,956,817 | 9/1990 | West et al. | 365/189.01 |
| 4,962,480 | 10/1990 | Ooumi et al. | 365/151 |
| 4,968,390 | 11/1990 | Bard et al. | 204/15 |
| 4,968,914 | 11/1990 | West et al. | 310/328 |
| 4,969,978 | 11/1990 | Tomita et al. | 204/153.1 |
| 4,992,659 | 2/1991 | Abraham et al. | 250/306 |
| 4,992,728 | 2/1991 | McCord et al. | 324/158 |
| 4,999,494 | 3/1991 | Elings | 250/306 |
| 4,999,495 | 3/1991 | Miyata et al. | 250/306 |
| 5,003,815 | 4/1991 | Martin et al. | 73/105 |
| 5,009,111 | 4/1991 | West et al. | 73/862.61 |
| 5,017,010 | 5/1991 | Mamin et al. | 356/345 |
| 5,018,865 | 5/1991 | Ferrell et al. | 356/376 |
| 5,025,658 | 6/1991 | Elings et al. | 73/105 |
| 5,047,633 | 9/1991 | Finlan et al. | 250/306 |
| 5,051,646 | 9/1991 | Elings et al. | 310/317 |
| 5,066,858 | 11/1991 | Elings et al. | 250/307 |
| 5,077,473 | 12/1991 | Elings et al. | 250/306 |
| 5,081,390 | 1/1992 | Elings | 310/328 |
| 5,103,095 | 4/1992 | Elings et al. | 250/306 |
| 5,107,113 | 4/1992 | Robinson | 250/306 |
| 5,107,114 | 4/1992 | Nishioka et al. | 250/306 |
| 5,117,110 | 5/1992 | Yasutake | 250/306 |
| 5,120,959 | 6/1992 | Tomita | 250/306 |
| 5,141,319 | 8/1992 | Kajimura et al. | 356/358 |
| 5,142,145 | 8/1992 | Yasutake | 250/306 |
| 5,144,833 | 9/1992 | Amer et al. | 73/105 |
| 5,155,361 | 10/1992 | Lindsay | 250/307 |
| 5,155,715 | 10/1992 | Ueyema et al. | 369/44.11 |
| 5,157,251 | 10/1992 | Albrecht et al. | 250/216 |
| 5,166,516 | 11/1992 | Kajimura | 250/234 |
| 5,168,159 | 12/1992 | Yagi | 250/306 |
| 5,189,906 | 3/1993 | Elings et al. | 73/105 |
| 5,196,713 | 3/1993 | Marshall | 250/561 |
| 5,198,715 | 3/1993 | Elings et al. | 310/328 |
| 5,202,004 | 4/1993 | Kwak et al. | 204/153 |
| 5,204,531 | 4/1993 | Elings et al. | 250/306 |
| 5,206,702 | 4/1993 | Kato et al. | 356/358 |
| 5,210,410 | 5/1993 | Barrett | 250/234 |
| 5,224,376 | 7/1993 | Elings et al. | 73/105 |
| 5,229,606 | 7/1993 | Elings et al. | 250/306 |
| 5,231,286 | 7/1993 | Kajimura et al. | 250/234 |
| 5,237,859 | 8/1993 | Elings et al. | 73/105 |
| 5,245,863 | 9/1993 | Kajimura et al. | 73/105 |
| 5,247,186 | 9/1993 | Toda | 250/561 |
| 5,253,516 | 10/1993 | Elings et al. | 73/105 |
| 5,257,024 | 10/1993 | West | 341/16 |
| 5,258,107 | 11/1993 | Yoshida et al. | 204/129.55 |
| 5,260,567 | 11/1993 | Kuroda et al. | 250/227.19 |
| 5,260,622 | 11/1993 | West | 310/328 |
| 5,260,824 | 11/1993 | Okada et al. | 359/368 |
| 5,262,643 | 11/1993 | Hammond et al. | 250/306 |
| 5,266,801 | 11/1993 | Elings et al. | 250/306 |
| 5,266,896 | 11/1993 | Rugar et al. | 324/307 |
| 5,266,897 | 11/1993 | Watanuki et al. | 324/244 |
| 5,267,471 | 12/1993 | Abraham et al. | 73/105 |
| 5,274,230 | 12/1993 | Kajimura et al. | 250/234 |
| 5,276,324 | 1/1994 | Ohtaki et al. | 250/306 |
| 5,280,341 | 1/1994 | Nonnenmacher et al. | 356/358 |
| 5,283,437 | 2/1994 | Greschner et al. | 250/306 |

| | | | | | | | |
|---|---|---|---|---|---|---|---|
| 5,283,442 | 2/1994 | Martin et al. | 250/561 | 5,308,974 | 5/1994 | Elings et al. | 250/234 |
| 5,286,977 | 2/1994 | Yokoyama et al. | 250/442.11 | 5,314,254 | 5/1994 | Yashar et al. | 384/49 |
| 5,289,004 | 2/1994 | Okada et al. | 250/306 | 5,314,829 | 5/1994 | Coles | 436/165 |
| 5,291,775 | 3/1994 | Gamble et al. | 73/105 | 5,317,153 | 5/1994 | Matsushiro et al. | 250/306 |
| 5,293,042 | 3/1994 | Miyamoto | 250/306 | 5,319,960 | 6/1994 | Gamble et al. | 73/105 |
| 5,294,804 | 3/1994 | Kajimura | 250/561 | 5,319,977 | 6/1994 | Quate et al. | 250/306 |
| 5,296,704 | 3/1994 | Mishima et al. | 250/306 | 5,321,977 | 6/1994 | Clabes et al. | 73/105 |
| 5,298,975 | 3/1994 | Khoury et al. | 356/375 | 5,323,003 | 6/1994 | Shido et al. | 250/306 |
| 5,304,924 | 4/1994 | Yamano et al. | 324/158 R | 5,324,935 | 6/1994 | Yasutake | 250/234 |
| 5,306,919 | 4/1994 | Elings et al. | 250/442.11 | 5,325,010 | 6/1994 | Besocke et al. | 310/317 |
| 5,307,693 | 5/1994 | Griffith et al. | 73/862.68 | 5,338,932 | 8/1994 | Theodore et al. | 250/306 |

CONTROLLED FORCE MICROSCOPE FOR OPERATION IN LIQUIDS

STATEMENT AS TO RIGHTS TO INVENTIONS

This invention was made with Government support under grant N00014-90-J-1455 awarded by the Office of Naval Research and Grant No. DIR-8920053 awarded by the National Science Foundation. The Government has certain rights in the invention.

BACKGROUND OF THE INVENTION

1. Field of the Invention

This invention relates to scanning force microscopy and more particularly to a microscope in which deflection of the force sensing probe is prevented by a feedback loop in which the force between the scanning force probe and sample surface is exactly canceled by a compensating force applied to the scanning force probe by a magnet. This arrangement permits the scanning force probe to be scanned over a surface without being pulled into it by attractive atomic forces. The signal from the force compensating feedback loop is used to drive the sample position in order to acquire topographical images of the sample surface at constant force and constant deflection of the scanning force probe.

2. The Prior Art

Figure 1:
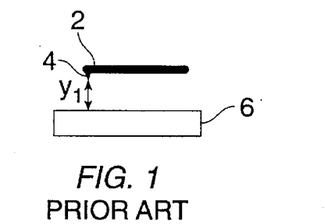
FIG. 1 is a schematic diagram of a force sensing probe and cantilever held some distance above a sample.
Figure 2:
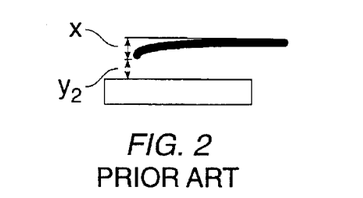
FIG. 2 is as in FIG. 1, but illustrating deflection of the cantilever as the probe is moved towards the sample.

All scanning probe microscopes suffer from possible mechanical instabilities of the scanning probe, but the problem is most severe for the atomic force microscope (AFM) when it is operated with a soft force sensing cantilever. A soft cantilever gives a bigger response for a given strength of interaction between the probe and the sample and is thus capable of resolving finer detail in the AFM image. A highly schematic arrangement of an AFM is shown in FIG. 1. Referring to this figure, a soft cantilever 2 with an asperity serving as a probe 4 is held some distance $y_1$ from the surface of a sample 6. As the sample is moved towards the probe, interaction forces cause a deflection of the cantilever. This is shown in FIG. 2 where the cantilever has been bent down an amount x in response to the surface force at a probe-surface distance $y_2$. An image of the surface topography is formed by adjusting the gap, $y_2$, so that the deflection of the cantilever, x, is kept constant. The adjustments in the gap, required to maintain a constant deflection x, mapped as a function of the position of the probe over the surface, generate a map of the surface topography of the sample.

Figure 3:
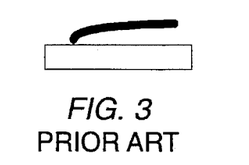
FIG. 3 is as in FIG. 2, but showing how the cantilever has jumped into contact with the sample surface after further approach.
Figure 4:
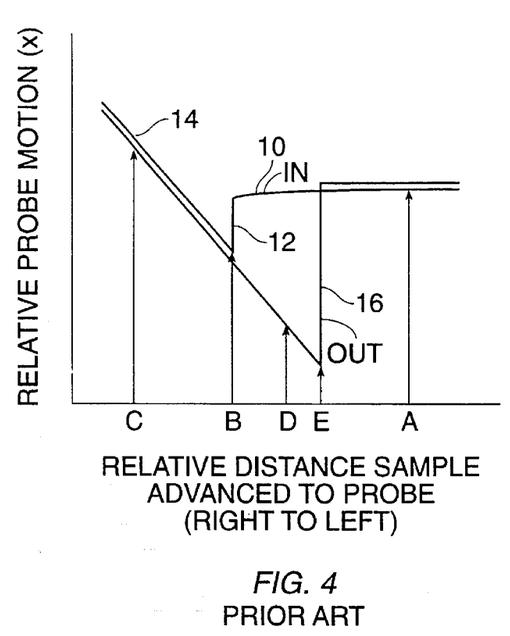
FIG. 4 shows a plot of cantilever deflection for an approach to and retraction from the sample.

The instability arises because surface forces rise rapidly as an inverse function of the gap, whereas the restoring force provided by the spring of the cantilever is linear in the displacement x. Specifically, if the surface forces vary as F(y) (where, for attractive forces, F(y) may be $a/y^7$)) and the restoring force varies as F(x)=−kx, then an instability arises when the surface forces increase more rapidly than the restoring force as the probe moves towards the surface. That is, when dF(y)/dy>k, the probe is pulled rapidly into the surface as illustrated in FIG. 3. This behavior is often observed when moving a soft cantilever towards a surface as a discontinuity in a plot of the deflection of the cantilever against the distance that the sample is moved towards the probe. This is illustrated in FIG. 4 which shows schematically the relative deflection of the cantilever as the sample is advanced towards the probe. This advance is represented by movement along the horizontal axis of FIG. 4 from right to left. The response of the probe depends upon whether it is being advanced towards the surface for the first time (curve labeled "IN") or retracted after contact with the surface (curve labeled "OUT"). Far from the surface ("A") the probe might be pulled down a little as shown at 10 by attractive interactions between the probe and surface. When surface forces increase more rapidly than the restoring force provided by the cantilever (at "B") the probe jumps to contact with the surface as shown at 12. When the probe is in contact with the surface ("B" to "C") the probe is pushed up with the surface, giving the constant increase in deflection as shown at 14. When the surface is pulled away (C→B→D→E), the probe rides down with it. When the original point of contact is reached ("B") the surface usually remains stuck to the probe owing to adhesive interactions. These adhesive interactions keep the probe in contact with the surface ("D") until the force generated by bending of the cantilever is big enough to overcome the adhesive interactions and pull the cantilever away ("E"). The probe then jumps away from the surface as shown at 16. Thus, once the probe has jumped into contact with the surface, a large range of interaction forces are inaccessible to and unmeasurable by the AFM. This inaccessible range corresponds to the probe deflection at the jump labeled 12 on the way in and the jump labeled 16 on the way out.

Figure 5:
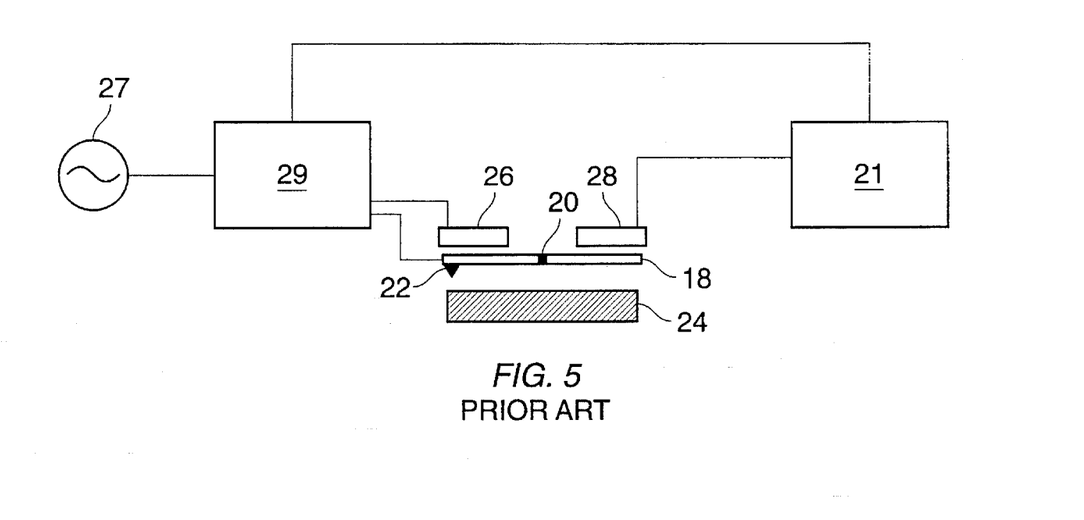
FIG. 5 illustrates a prior art force compensated microscope.

A solution to this problem has been proposed by Joyce et al. [Physical Review Letters 68, 2790, 1992] and it is illustrated in FIG. 5. A rigid cantilever 18 is pivoted about its midpoint 20 so that it can rock about midpoint 20. A force sensing probe 22 is attached to one end of cantilever 18 and interacts with a sample 24. The rocking cantilever 18 is an electrical conductor and it interacts with two other conductors 26 and 28 placed in close proximity to it. This arrangement corresponds to two electrical capacitors, one formed by the cantilever 18 and the conductor 26 above the probe 22 and the other formed by the cantilever 18 and the conductor 28 above the end of cantilever 18 opposite to the probe 22. The capacitor (elements 18, 26) above the probe 22 is used as a detector to sense movement of the probe 22. Small variations in the spacing are sensed as variations in an AC signal 27 derived from a conventional capacitance measuring bridge circuit 29. The second capacitor formed from elements 28 and 18 serves to apply an electrostatic force in just such a manner as to cancel motion of cantilever 18. This is achieved by applying a high voltage between the capacitor plate 28 and the cantilever 18. The voltage is supplied by an amplifier 21 which is fed from a DC signal obtained from a rectified output of the measuring bridge 29. The phase of the rectified signal is chosen so as to result in a negative feedback which keeps the cantilever 18 at its initial position so that no error signal is generated by the measuring bridge circuit 29. In this way, motion of cantilever 18 is prevented provided that surface forces are within the range that can be compensated for by this feedback mechanism. The feedback signal 27 serves as the measure of the interaction force between the probe 22 and sample 24 and is used to control the gap between the sample 24 and probe 22 so as to generate a topographical image of the sample surface. In this case, doing so without motion of the probe 22 and without mechanical instability.

The prior art suffers from the drawback that a mechanical rocker must be constructed and this is much more complex to fabricate than the bending cantilevers in use at present (such as those described by Drake et al. [Science 243, 1586, 1989]). Furthermore, the cantilever is electrified and cannot be operated in a conductive fluid such as water.

OBJECTS AND ADVANTAGES OF THE INVENTION

Accordingly, it is an object of the present invention to provide a force compensated microscope in which the force sensing probe is not deflected by surface forces and does not suffer from mechanical instabilities.

It is a further object of the present invention to provide a force compensated microscope in which the force sensor is a conventional microfabricated cantilever.

Yet a further object of the present invention to provide a force compensated microscope that will operate in an electrically conductive fluid such as water.

These and many other objects and advantages of the present invention will become apparent to those of ordinary skill in the art from a consideration of the drawings and ensuing description of the invention.

SUMMARY OF THE INVENTION

The foregoing objects have been achieved in the scanning force microscope of the present invention. It comprises a force sensing microfabricated cantilever which is held over the sample to be studied. Deflection of the cantilever is sensed by an optical beam as described by Drake et al. [Science 243, 1586, 1989] and an image is formed by a relative scanning motion of the probe over the surface of the sample, while monitoring the interaction force between the probe and the sample surface. Deflection of the cantilever (with consequent mechanical instability) is prevented in the present invention by application of a magnetic compensating force to the end of the cantilever. A small magnetic particle is attached to the cantilever above the probe in a manner such as to cause negligible interference with the optical beam used to monitor deflection. A solenoid is placed in close proximity to the force sensing cantilever so as to generate a magnetic field which varies in magnitude with distance in the direction of deflection of the cantilever. The action of this field gradient on the magnetic moment of the particle attached to the cantilever generates a force which may be used to compensate for the surface force that acts on the probe below the magnetic particle. If the field gradient along the direction of cantilever deflection (x) is dB/dx and the magnetic moment of the particle in this direction is $M^x$, then the force applied to the cantilever along the x direction is $F^x$, given by $F^x = M^x (dB/dx)$. Gradients of several hundred Gauss/cm are easily obtained at convenient (centimeter) distances from a small solenoid convenient for placement in an AFM. Surface forces are typically nN or $10^{-4}$ dynes, so a particle with a moment of $10^{-6}$ esu is adequate. Such a moment is easily obtained with a rare-earth magnet of dimensions on the order of a micron, a convenient size for attachment to the end of a microfabricated force sensing cantilever.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 6:
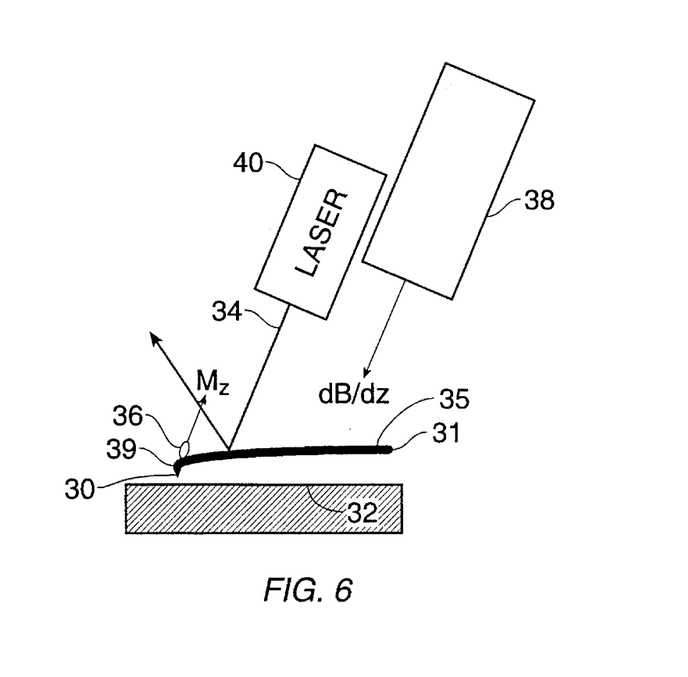
FIG. 6 shows schematically how a magnetic particle in an inhomogeneous magnetic field is used to provide a compensating force in the present invention.
Figure 7:
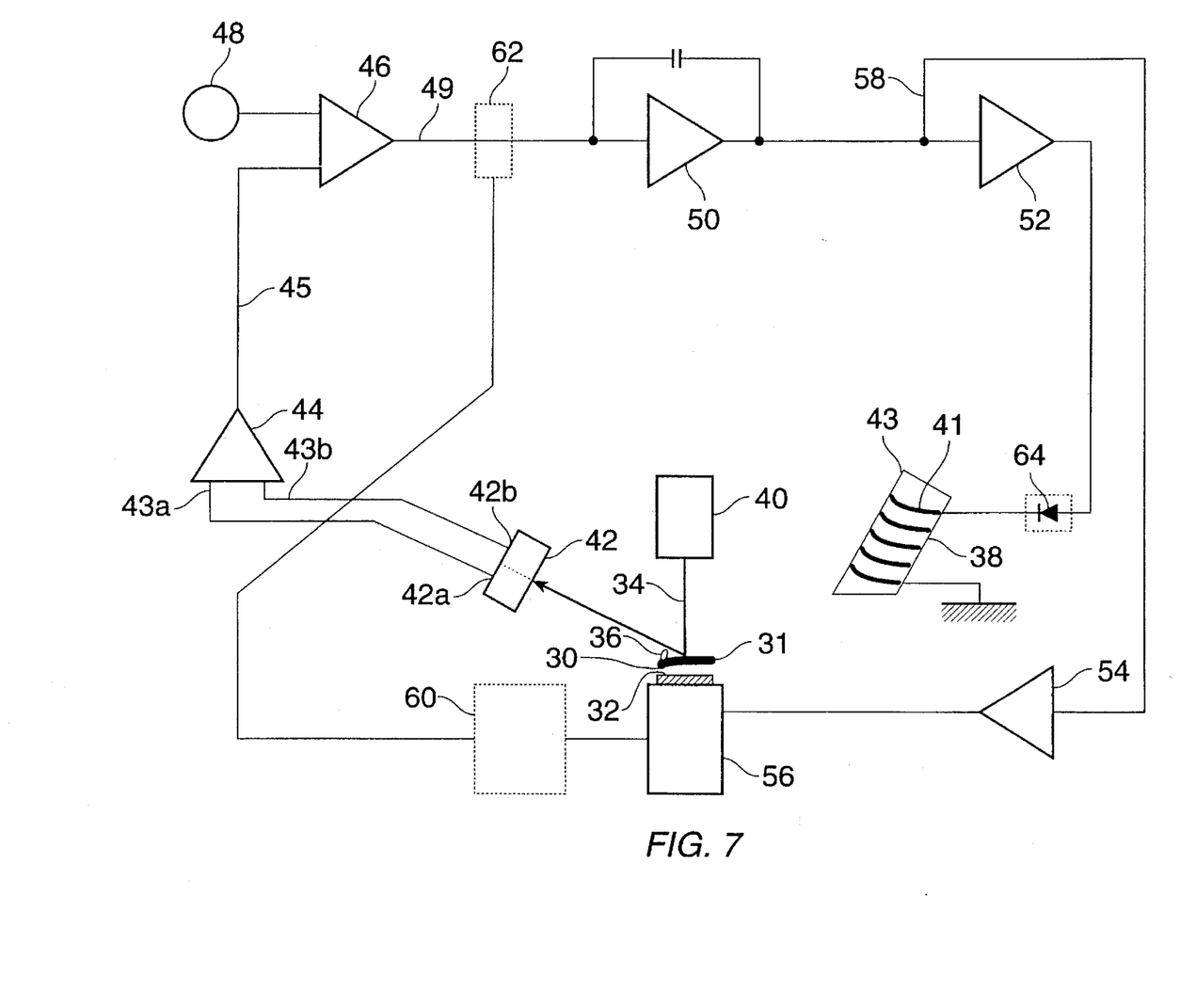
FIG. 7 shows the overall layout of a practical scanning microscope which images in the compensated force mode according to the present invention.

The essential elements of the AFM microscope according to the presently preferred embodiment of the present invention are shown in FIGS. 6 and 7. Referring to FIG. 6, a force sensing probe 30 on a deformable cantilever 31 (collectively referred to as a force sensing cantilever) is held over a sample surface 32. A laser beam 34 from a suitable laser light source 40 is deflected from the back 35 of the cantilever 31 so that motion of the cantilever may be detected as it is scanned over the surface of the sample as described by Drake et al. [Science 243, 1586, 1989]. The cantilevers as used herein are preferably microfabricated using lithographic methods and are available as commercial products. An example is the Microlever™ available from Park Scientific Inc. of Sunnyvale, Calif. A small solenoid 38 is arranged so as to generate a magnetic field gradient in the vicinity of the end of the force sensing cantilever with the direction of the gradient having a component along the direction of deflection of the cantilever. A magnetic particle 36 is attached to a distal end 39 cantilever 31 above probe 30 and is arranged so that its magnetic moment $M_z$ lies along the direction of the deflection of cantilever 31 as shown in FIG. 6.

According to a presently preferred embodiment of the present invention, magnetic particle 36 is made from a small piece of a rare-earth cobalt magnet obtained by abrading such a magnet with a fine file. Magnetic particle 36 is placed on the distal end 39 of cantilever 31 and is preferably attached by a small patch of epoxy adhesive (not shown). Magnetic particle 36 is preferably oriented by applying a magnetic field to it as the epoxy adhesive cures forcing it to assume a proper alignment. In other embodiments, the magnetic particles may be iron, nickel, cobalt, neodymium, boron-strontium alloys, chromium oxide or other magnetic materials having the property of being attracted to an activated solenoid. In yet a further embodiment, cantilever 31 may be magnetized by sputtering or evaporation of magnetic material onto the back of the cantilever (not shown).

According to a presently preferred embodiment, solenoid 38 is made by pile-winding several hundred turns of insulated wire 41 onto a core 43 made from the linear magnetic alloy permendur®, an alloy available from Eagle Alloys Inc. of Jefferson City, Tenn.). According to a presently preferred embodiment, the solenoid is pile-wound to reduce capacitance and speed up the response of the solenoid. Pile winding is a method of winding a solenoid whereby turns are spread about somewhat haphazardly (such as might result from winding by hand) in order to increase the distance between neighboring turns and thus reduce the stray capacitance between turns. Three hundred turns 41 operated at a current of 200 mA using a 0.125" diameter core 43 produce a field gradient of 500 Gauss/meter 5 millimeters from the end of core 43. Pile winding has the advantage of reducing the capacitance of solenoid 38 and thus, increasing its frequency response. For the solenoid described, the response time is about one microsecond. In accordance with other preferred embodiments of the invention, core 43 may be fabricated from similar materials such as low silicon-iron, conpernik®, perminvar®, hipernik®, nikalloy® (these last four alloys are also available from Eagle Alloys of Jefferson City, Tenn.), and mild steel.

According to the preferred embodiment and referring to FIG. 7, deflection of cantilever 31 is detected by a bi-cell silicon photodiode position detector 42 which monitors the motion of cantilever 31 through the consequent motion (deflection) of reflected laser beam 34. The deflection is detected by a change in the relative illumination of the segments 42a, 42b of bi-cell photodiode 42, detected by taking a difference of the signals 43a, 43b from the bi-cell photodiode segments 42a, 42b, respectively, using operational amplifier 44 as is well known to those of ordinary skill in the art. Some fixed deflection of cantilever 31 may be obtained by summing a set-point voltage signal 48 with this difference signal 45 using operational amplifier 46. The resultant deflection error signal 49 is integrated by integrator 50, the output of which is amplified by power amplifier 52 which drives a current in a solenoid 38 to apply a force to magnetic particle 36 on the end of cantilever 31 in such a manner as to oppose the deflection error signal 49 and keep the cantilever deflection at the level determined by set-point voltage signal 48. The voltage out of integrator 50 is a signal on a line labeled 58 and is therefore a measure of the force applied to the distal end 39 of cantilever 31 since it will rise or fall so as to oppose exactly any force applied as a consequence of an interaction between the force sensing probe 30 and sample 32. This signal on line 58 is then fed into the input of a conventional atomic force microscope controller 54 such as that described by Elings et al. in U.S. Pat. No. Re. 34,331. This controls the relative position of sample 32 and force sensing probe 30 on cantilever 31 by means of a conventional XYZ piezoelectric actuator 56 such as that described by Binnig and Smith [Review of Scientific Instruments vol. 57, p. 1688, (1986)]. XYZ piezoelectric actuator is a combined XY scanner and Z scanner, i.e., the XY scanner portion moves the sample back and forth under the force sensing probe 30 and the Z scanner portion is capable of moving the sample closer to and further from force sensing probe 30. There is no requirement that a single XYZ piezoelectric actuator be used, an XY scanner and a Z scanner could also be used. Also, the XY scanner and/or the Z scanner could be attached to the cantilever 31 rather than the sample 32.

In another embodiment of the present invention, the distance between sample 32 and force sensing probe 30 is optionally modulated by applying a small AC voltage signal 60 to piezoelectric actuator 56 so as to modulate the Z axis, that is so to increase and decrease the distance between the sample and the probe. This results in a corresponding modulation of the force signal out of the bi-cell photodiode, 42a, 42b. A lock-in detector 62 is added into the control circuit in order to produce a DC error signal from the magnitude of this AC force signal which appears at the output of 46 as an AC signal 49 as a consequence of the AC modulation 60 applied to the Z transducer 56. The lock-in detector may be a commercial product such as the model SR530 from Stanford Research Systems of Sunnyvale, Calif. Persons skilled in the art will recognize that a custom circuit can be assembled to achieve lock-in detection on a board that is part of the microscope electronics assembly by using integrated circuits or a digital signal processing board. The advantage of using this modulation technique is an enhancement of the signal to noise ratio in the deflection signal. Noise, such as thermal fluctuations, Johnson noise and shot noise has a power spectrum which varies as the square root of the bandwidth of the detection system. Therefore, noise may be rejected if the bandwidth of the system is reduced. It is not feasible to do this around zero frequency and a great improvement results if the error signal is obtained by modulating the parameter to be controlled (in this case, the gap between the sample and probe). The error signal is then obtained by coherent detection of the AC modulation using a lock-in detector. The bandwidth of the lock-in detector 62 is adjusted so that the frequency response of the control loop is adequate for the required imaging speed, resulting in improved noise rejection at slower scanning speeds. A typical image is acquired in about two minutes (for a full scan). If the image consists of 400 lines, each composed of 400 points, then each data point is obtained in 120/160,00 seconds or 0.8 mS. In this case, an optimal bandwidth for the signal acquisition system would be 1.33 kHz. If, however, the scan speed were slowed down to 20 minutes for a full image, the bandwidth could be reduced to 0.133 kHz, giving a tenfold reduction in noise voltage (or a factor 3.16 reduction in noise power). Thus the microscope force sensitivity may be greatly increased so that the microscope may be operated at a smaller set-point force.

It is often desirable to limit the response of the magnetic part of the system to only those motions which retract the force sensing probe 30 from the surface of the sample 32. This is because of an unfavorable condition that might arise when the force sensing probe 30 does contact the surface. In this case, the piezoelectric actuator 56 pulls the sample away from the force sensing probe 30 while the magnetic system pushes the force sensing probe 30 down toward the surface of sample 32. If the response of the magnetic control system is faster than the response of the piezoelectric actuator 56, this condition could cause the force sensing probe 30 to be pushed further into the sample surface 32. This problem is eliminated if the magnetic system is polarized (shown schematically by diode 64) so that it can only pull the force sensing probe 30 away from the surface 32. According to a preferred embodiment of the present invention, this polarization is achieved by applying a magnetic field of known orientation to the magnetic particle as it is placed into the adhesive on the end of the cantilever. This results in the particle adopting a preferred orientation, e.g., north pole pointing normal to the plane of the cantilever and away from the probe. Thus, the direction of deflection for a given field applied to the solenoid is determined. Also, twisting of the cantilever owing to application of an undesired torque by the particle in the solenoid field may be minimized.

Figure 8:
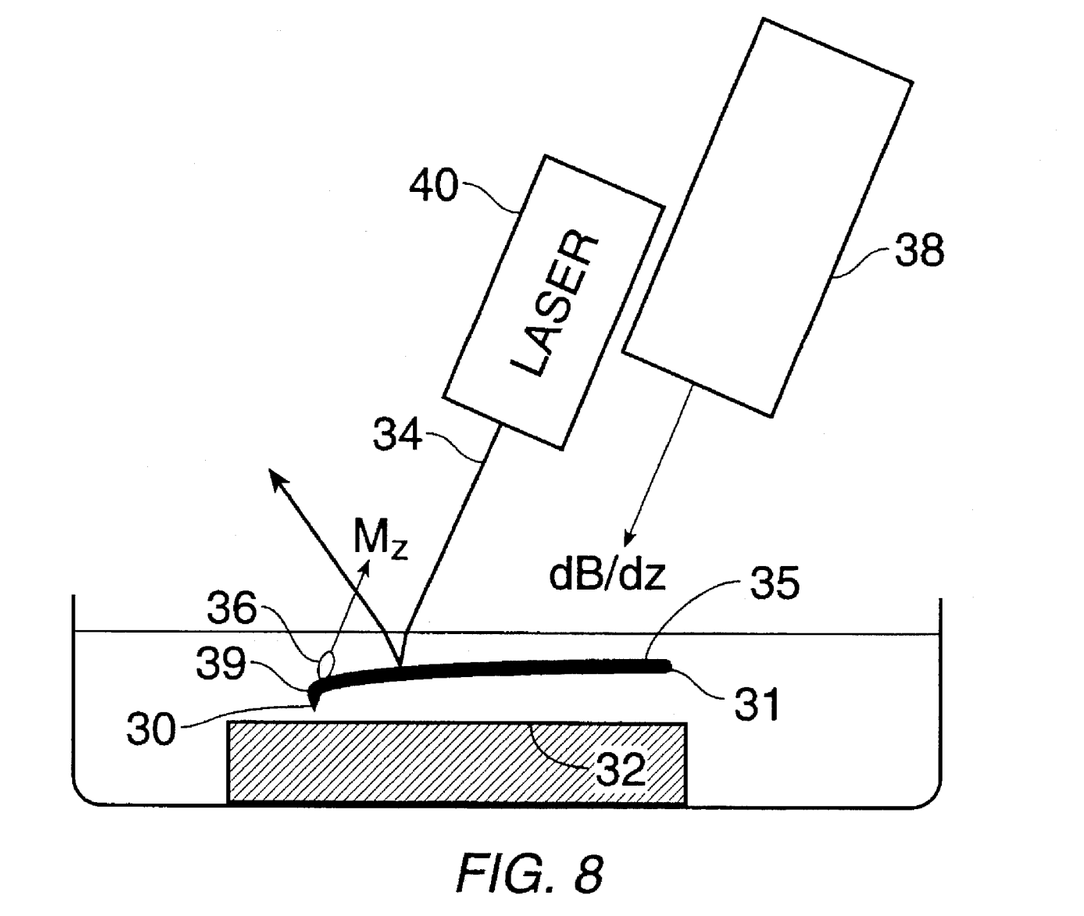
FIG. 8 shows use of the microscope of the present invention under a conductive fluid such as water.

FIG. 8 shows the use of the microscope of the present invention under a conductive fluid such as water.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A scanning probe microscope for generating a signal corresponding to the surface characteristics of a scanned sample, comprising:

a force sensing probe tip disposed on a first side of a free end of a flexible cantilever and adapted to be brought into close proximity to a sample surface;

an XY scanner for generating relative scanning movement between said force sensing probe tip and said sample surface;

a Z control for adjusting the distance between said force sensing probe tip and said sample surface;

a deflection detector for detecting deflection of said flexible cantilever; and a magnetic control system responsive to said deflection of said flexible cantilever for providing a magnetic force to said flexible cantilever which counters an atomic force of attraction applied to said flexible cantilever due to interaction between said force sensing probe tip and said sample surface in order to minimize movement of said force sensing probe tip during scanning of said sample surface.

2. A scanning probe microscope according to claim 1 wherein said magnetic force is one attracting said force sensing probe away from said sample surface.

3. A scanning probe microscope according to claim 1 wherein:

said z-control further includes a signal generator for generating a signal which modulates said distance between said force sensing probe tip and said sample surface.

4. A scanning probe microscope according to claim 3 wherein:

said modulation of said distance between said force sensing probe tip and said sample surface is detected with a lock in detector which produces an error signal which is applied to said z-control in order to reduce the bandwidth of said deflection detector.

5. A scanning probe microscope for generating a signal corresponding to the surface characteristics of a scanned sample, comprising:

a force sensing probe tip disposed on a first side of a free end of a flexible cantilever and adapted to be brought into close proximity to a sample surface;

an XY scanner for generating relative scanning movement between said force sensing probe tip and said sample surface;

a Z control for adjusting the distance between said force sensing probe tip and said sample surface;

a deflection detector for detecting deflection of said flexible cantilever; and a magnetic control system responsive to said deflection of said flexible cantilever for providing a magnetic force to said flexible cantilever which counters an atomic force of attraction applied to said flexible cantilever due to interaction between said force sensing probe tip and said sample surface in order to minimize movement of said force sensing probe tip during scanning of said sample surface, wherein said magnetic control system includes:

a magnetic material capable of being attracted by a solenoid disposed on said flexible cantilever; and a solenoid having a current flowing therein, said solenoid oriented to be capable of exerting an attractive magnetic force upon said magnetic material, said current flowing in said solenoid responsive to said deflection of said flexible cantilever such that increasing deflection results in increasing current flow within said solenoid.

6. A scanning probe microscope according to claim 5 wherein said flexible cantilever, said force sensing probe tip and said sample surface are all submerged in a fluid.

7. A scanning probe microscope according to claim 6 wherein said fluid is a liquid.

8. A scanning probe microscope according to claim 7 wherein said fluid is water.

9. A scanning probe microscope according to claim 5 wherein said magnetic force is one of attraction between said magnetic material and said solenoid.

10. A scanning probe microscope for generating a signal corresponding to the surface characteristics of a scanned sample, comprising:

a force sensing probe tip disposed on a first side of a free end of a flexible cantilever and adapted to be brought into close proximity to a sample surface;

an XY scanner for generating relative scanning movement between said force sensing probe tip and said sample surface;

a Z control for adjusting the distance between said force sensing probe tip and said sample surface;

a deflection detector for detecting deflection of said flexible cantilever; and a magnetic control system responsive to said deflection of said flexible cantilever for providing a magnetic force to said flexible cantilever which counters an atomic force of attraction applied to said flexible cantilever due to interaction between said force sensing probe tip and said sample surface in order to minimize movement of said force sensing probe tip during scanning of said sample surface wherein said magnetic control system includes:

a magnetic material capable of being attracted by a solenoid disposed on said flexible cantilever; and a solenoid having a current flowing therein, said solenoid oriented to be capable of generating a magnetic field extending along its axis and varying in magnitude as a function of linear distance from said solenoid, said magnetic material oriented so that it has a substantial magnetic moment directed substantially parallel to said axis of said solenoid, and said current flowing in said solenoid responsive to said deflection of said flexible cantilever in a manner that increasing deflection of said flexible cantilever results in increasing current flow within said solenoid.

11. A microscope for determining the characteristics of the surface of a sample, said microscope comprising:

a force sensing probe tip disposed on a free end of a flexible cantilever;

means for detecting bending of said cantilever;

means for scanning said force sensing probe tip relative to the surface of the sample; and means responsive to said bending for applying a magnetic compensating force to said force sensing probe tip for cancelling deflection of said probe.

12. A microscope according to claim 11 wherein said force sensing probe tip and the surface of the sample are all submerged in a fluid.

13. A microscope according to claim 12 wherein said fluid is a liquid.

14. A microscope according to claim 13 wherein said fluid is water.

15. A microscope for determining the characteristics of the surface of a sample, said microscope comprising:
- a force sensing probe tip disposed on a free end of a flexible cantilever;
- means for detecting bending of said cantilever;
- means for scanning said force sensing probe tip relative to the surface of the sample; and
- means responsive to said bending for applying a magnetic compensating force to said force sensing probe tip for cancelling deflection of said probe,
- wherein said magnetic compensating force is one only pulling said force sensing probe away from the surface of the sample.

* * * * *

UNITED STATES PATENT AND TRADEMARK OFFICE
CERTIFICATE OF CORRECTION

PATENT NO. : 5,515,719
DATED : May 14, 1996
INVENTOR(S) : Stuart Lindsay

It is certified that error appears in the above-indentified patent and that said Letters Patent is hereby corrected as shown below:

On Column 6, line 26, replace "120/160,00" with --120/160,000--.

Signed and Sealed this

Thirty-first Day of December, 1996

Attest:

BRUCE LEHMAN

Attesting Officer     Commissioner of Patents and Trademarks